(12) United States Patent
Krishnan et al.

(10) Patent No.: US 8,141,435 B2
(45) Date of Patent: Mar. 27, 2012

(54) PRESSURE MEASUREMENT FOR FLOW METERING DEVICE

(75) Inventors: Sandeep Krishnan, San Diego, CA (US); Mark Robert Huebscher, San Diego, CA (US)

(73) Assignee: Precision Engine Controls Corporation, San Diego, CA (US)

( * ) Notice: Subject to any disclaimer, the term of this patent is extended or adjusted under 35 U.S.C. 154(b) by 474 days.

(21) Appl. No.: 12/534,570

(22) Filed: Aug. 3, 2009

(65) Prior Publication Data

US 2011/0029258 A1 Feb. 3, 2011

(51) Int. Cl.
*G01F 1/34* (2006.01)
(52) U.S. Cl. .................................................. 73/861.42
(58) Field of Classification Search ............... 73/861.42, 73/861.44
See application file for complete search history.

(56) References Cited

U.S. PATENT DOCUMENTS

| | | |
|---|---|---|
| 3,809,362 A | 5/1974 | Baumann |
| 3,977,382 A | 8/1976 | Tuzson et al. |
| 4,190,231 A | 2/1980 | Vimercati |
| 4,360,370 A | 11/1982 | McAndrew |
| 4,362,185 A | 12/1982 | Kadner |
| 4,375,169 A | 3/1983 | Torresin |
| 4,474,356 A | 10/1984 | Baumann |
| 4,506,860 A | 3/1985 | von Schwerdtner et al. |
| 4,522,223 A | 6/1985 | Balsys et al. |
| 4,607,822 A | 8/1986 | Schabert et al. |
| 4,646,786 A | 3/1987 | Herder et al. |
| 4,679,765 A | 7/1987 | Kramer et al. |
| 4,729,075 A | 3/1988 | Paradis |
| 4,796,651 A | 1/1989 | Ginn et al. |
| 4,842,246 A | 6/1989 | Floren et al. |
| 4,850,392 A | 7/1989 | Crump et al. |
| 4,976,404 A | 12/1990 | Ichikawa et al. |
| 5,107,674 A | 4/1992 | Wibbelsman et al. |
| 5,123,436 A | 6/1992 | Koechlein et al. |
| 5,146,941 A | 9/1992 | Statler |
| 5,211,198 A | 5/1993 | Tinholt |
| 5,232,195 A | 8/1993 | Torrielli |
| 5,259,590 A | 11/1993 | Chambers |
| 5,309,934 A | 5/1994 | Jaeger |
| 5,318,270 A | 6/1994 | Detanne et al. |
| 5,379,584 A | 1/1995 | Windish et al. |

(Continued)

FOREIGN PATENT DOCUMENTS

WO WO 2008/007829 A1 1/2008

OTHER PUBLICATIONS

Combined Search and Examination Report for Application Serial No. GB1013095.3, filed Aug. 3, 2010.

*Primary Examiner* — Jewel V Thompson
(74) *Attorney, Agent, or Firm* — Kinney & Lange, P.A.

(57) ABSTRACT

A flow metering device includes a flow tube, a motor for positioning the flow tube, an outlet nozzle in fluid communication with the flow tube, and an inlet nozzle in fluid communication with the flow tube. The outlet nozzle has an outlet pressure tap and the inlet nozzle has an inlet pressure tap. The inlet nozzle, the flow tube, and the outlet nozzle define a flow path that has a plurality of recirculation zones. At least one of the inlet pressure tap and the outlet pressure tap opens within one of the recirculation zones.

20 Claims, 6 Drawing Sheets

U.S. PATENT DOCUMENTS

| | | |
|---|---|---|
| 5,503,363 A | 4/1996 | Wallace |
| 5,544,856 A | 8/1996 | King et al. |
| 5,594,665 A | 1/1997 | Walter et al. |
| 5,641,148 A | 6/1997 | Pena et al. |
| 5,878,992 A | 3/1999 | Edwards et al. |
| 5,904,335 A | 5/1999 | Oyama |
| 5,919,669 A | 7/1999 | Then et al. |
| 6,129,333 A | 10/2000 | Ma |
| 6,392,322 B1 | 5/2002 | Mares et al. |
| 6,427,970 B1 | 8/2002 | Silva |
| 6,882,924 B2 | 4/2005 | Miller |
| 7,537,022 B2 * | 5/2009 | LaBenz et al. ............ 137/554 |
| 7,644,574 B2 * | 1/2010 | Feiz ............ 60/39.281 |
| 2004/0168508 A1 | 9/2004 | Henderson et al. |
| 2005/0021213 A1 | 1/2005 | Miller |

\* cited by examiner

PRESSURE MEASUREMENT FOR FLOW METERING DEVICE

BACKGROUND

The present invention relates to fluid sensing systems and methods, and more particularly, to fluid sensing for fuel metering units.

Gas turbine engines commonly utilize fuel metering units to regulate the flow of fuel between a fuel supply and a combustor assembly. Fuel metering units sense a variety of parameters to regulate proper fuel flow. For example, fuel metering parameters include, but are not limited to, inlet pressure, outlet pressure, temperature, and valve position (also known as "stroke"). Improving the ability to accurately sense each fuel metering parameter helps improve fuel delivery accuracy and efficiency to reduce emissions.

Accordingly, improvements to sensing fuel metering parameters are needed to increase controllable flow accuracy and efficiency, thereby reducing emissions. Additionally, improvements are needed in order to enhance the accuracy and efficiency of fuel delivery over varying pressure ranges.

SUMMARY

A flow metering device according to the present invention includes a flow tube, a motor for positioning the flow tube, an inlet nozzle in fluid communication with the flow tube, and an outlet nozzle in fluid communication with the flow tube. The inlet nozzle has an inlet pressure tap and the outlet nozzle has an outlet pressure tap. The inlet nozzle, the flow tube, and the outlet nozzle define a flow path that has a plurality of recirculation zones. At least one of the inlet pressure tap and the outlet pressure tap opens within one of the recirculation zones.

DETAILED DESCRIPTION

The present invention, generally, measures the flow of a fluid, such as fuel for a gas turbine engine, reciprocating engine, etc. Fuel metering units sense a variety of fuel parameters, including pressure, to regulate proper fuel flow. Fuel is diverted to pressure sensors through pressure taps that open to "dead zones" with relatively minimal turbulence and therefore relatively minimal dynamic pressure effects. As a result, the pressure sensors are primarily subjected to static pressure, which relatively increases measuring accuracy. In alternative embodiments, the present invention can be used with any fluid as desired.

Figure 1:
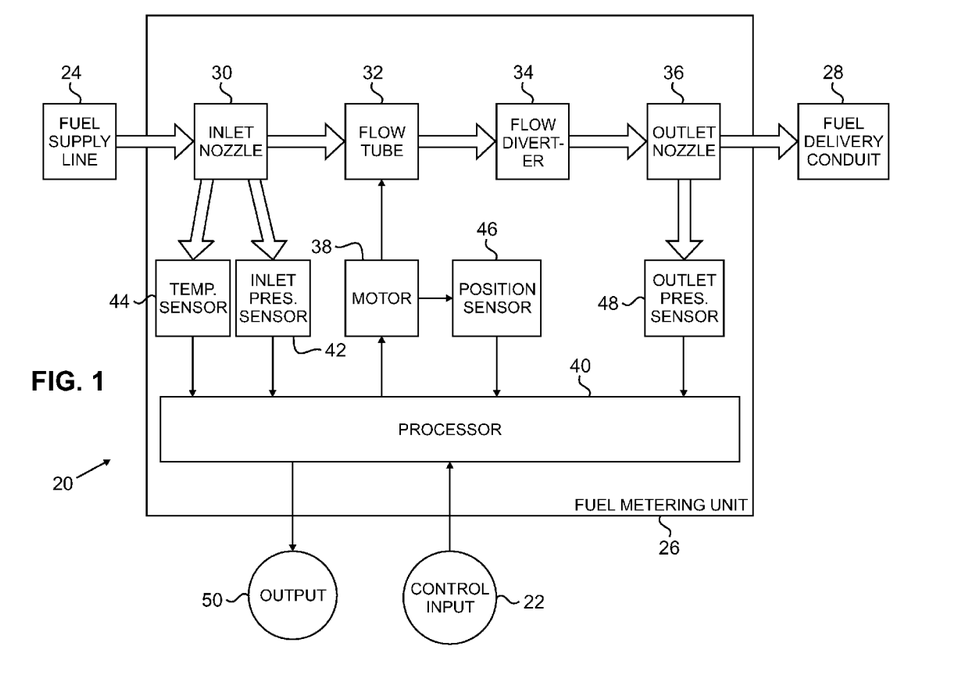
FIG. 1 is a block diagram of a fuel metering system according to the present invention.

FIG. 1 is a block diagram of fuel metering system 20 suitable for use with a gas turbine engine (not shown). Fuel metering system 20, which receives commands from control input 22, includes fuel supply line 24, fuel metering unit 26, and fuel delivery conduit 28. Fuel metering unit 26 includes inlet nozzle 30, flow tube 32, flow diverter 34, outlet nozzle 36, motor 38 (i.e., a motor capable of producing linear motion), processor 40, inlet pressure sensor 42, temperature sensor 44, position sensor 46, and outlet pressure sensor 48. Processor 40 provides a signal to output 50.

During operation, fuel supply line 24 supplies fuel to fuel metering unit 26, which delivers the fuel in a metered and controlled manner out through fuel delivery conduit 28 to a combustor (not shown). Within fuel metering unit 26, the fuel flows through inlet nozzle 30, flow tube 32, and outlet nozzle 36, and then exits fuel metering unit 26.

At inlet nozzle 30, a portion of the fuel is diverted to inlet pressure sensor 42. Inlet pressure sensor 42 senses the fuel pressure at the inlet of fuel metering unit 26 and generates an inlet pressure signal. Temperature sensor 44 senses the fuel temperature at the inlet of fuel metering unit 26 and generates a temperature signal. Both the input pressure signal and the temperature signal are received by processor 40. Inlet pressure sensor 42 and temperature sensor 44 can be of known configurations. Processor 40 can be of a known configuration.

Motor 38, which can be of a known configuration, supports and selectively moves flow tube 32 toward and away from flow diverter 34, which is fastened by a threaded fastener to outlet nozzle 36. Position sensor 46 senses a distance of flow tube 32 from flow diverter 34—the distance is synonymously called "stroke"—and generates a position signal. In operation, a flow rate of the fuel through fuel metering unit 26 can be controlled by selectively positioning flow tube 32 relative to flow diverter 34. For example, a distance of zero would mean that the flow is completely stopped at flow diverter 34. By actuating motor 38 to move flow tube 32 away from flow diverter 34, a gap is formed between flow tube 32 and flow diverter 34 permitting flow.

At outlet nozzle 36, an additional portion of the fuel is diverted to outlet pressure sensor 48. Outlet pressure sensor 48 senses the fuel pressure at the outlet of fuel metering unit 26 and generates an output pressure signal. Both the position signal and the outlet pressure signal are received by processor 40. Position sensor 46 and outlet pressure sensor 48 can each be of any known configuration.

Fuel metering unit 26 can be configured and operated generally similar to that described in U.S. Pat. No. 6,882,924 to Miller, which describes a fuel metering valve and a control system for regulating fuel delivery to a gas turbine engine. However, the configuration of fuel metering unit 26 can vary as desired for particular applications.

Figure 2:
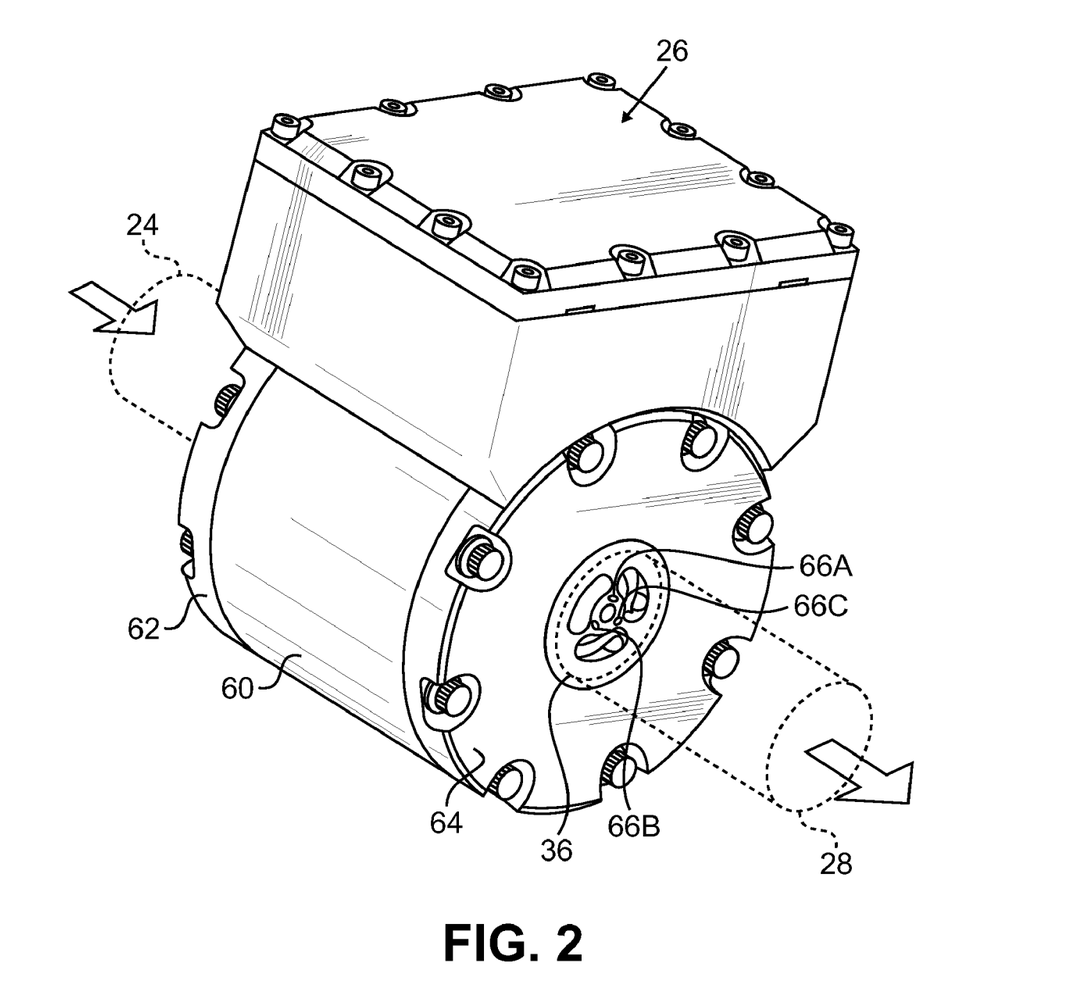
FIG. 2 is a perspective view of a fuel metering device of the fuel metering system.

FIG. 2 is a perspective view of fuel metering unit 26, which includes fuel meter housing 60. Fuel metering unit 26, which includes inlet nozzle 30 and outlet nozzle 36, is mated in sealed engagement with fuel supply line 24 (shown in phantom) and fuel delivery conduit 28 (shown in phantom). Inlet nozzle 30 is supported by inlet nozzle support structure 62. Similarly, outlet nozzle 36 is supported by outlet nozzle support structure 64.

Fuel delivery conduit 28 is secured in sealing engagement with outlet nozzle 36. Outlet nozzle 36 can be threaded, for example, into outlet nozzle support structure 64, which can be fastened, in one alternative shown in FIG. 2, to fuel meter housing 60 using bolts. The shape and dimensions of outlet nozzle support structure 64 can vary as desired for particular applications. As shown in FIG. 2, outlet nozzle 36 has outlet pressure taps 66A-66C for each diverting a portion of the fuel to outlet pressure sensor 48.

Similarly, fuel supply line 24 (shown in phantom) is mated in sealed engagement with inlet nozzle 30 (not visible in FIG. 2), which is located on an opposite side of fuel metering unit 26 from outlet nozzle 36. Inlet nozzle 30, can be threaded, for example, into inlet nozzle support structure 62, which can be fastened, as shown in one alternative in FIG. 2, to fuel meter housing 60 using bolts or other suitable fasteners. The shape and dimensions of inlet nozzle support structure 62 can vary as desired for particular applications.

Figure 3:
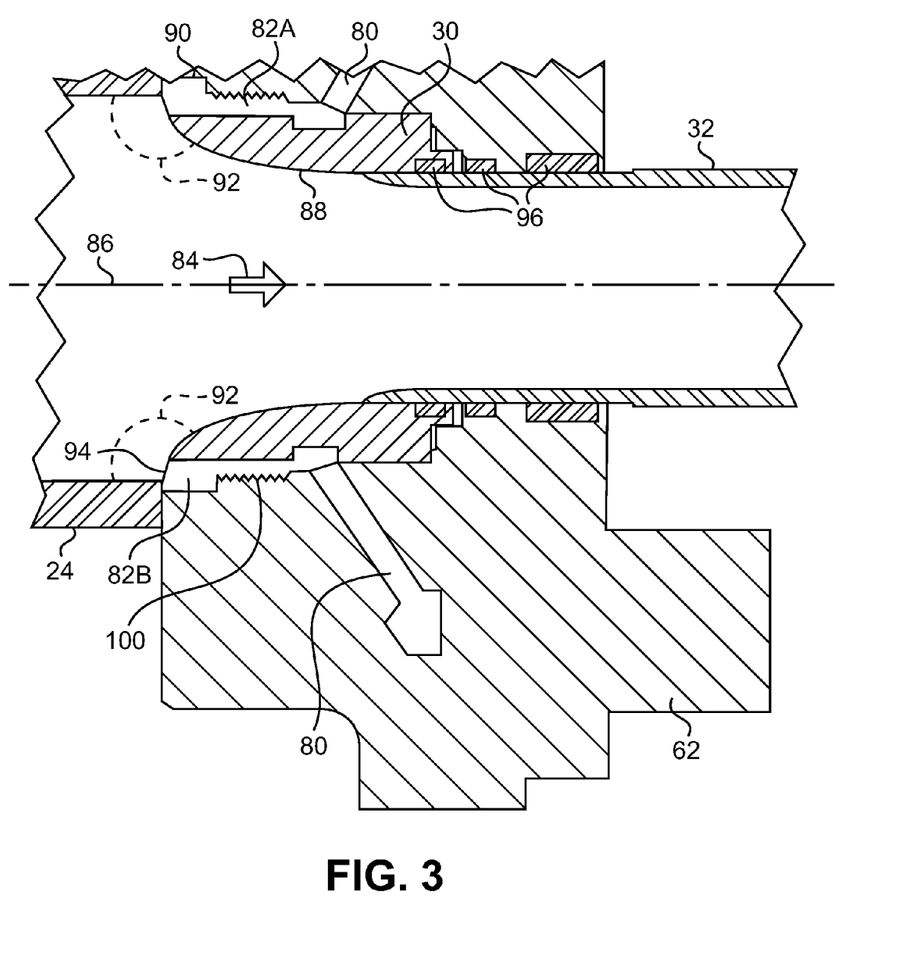
FIG. 3 is a section view of an embodiment of an inlet nozzle and an inlet nozzle support structure of the fuel metering device.

FIG. 3 is a section view of inlet nozzle 30 and inlet nozzle support structure 62. Inlet nozzle 30 can be threaded into inlet nozzle support structure 62, which includes inlet cavity 80. The fuel flows from fuel supply line 24 to inlet nozzle 30 and then into flow tube 32. Inlet nozzle 30 includes inlet pressure taps 82A-82B and forms flow path 84 along flow axis 86. As shown in FIG. 3, inlet nozzle 30 forms flow path 84 that is convergent. Inlet nozzle 30 forms a toroidal surface that extends between inlet inner diameter 88 and inlet outer diameter 90 and is exposed to the flow path 84.

During operation, inlet recirculation zone 92 forms in the fuel along flow path 84 at upstream face 94 at or near outer diameter 90 of inlet nozzle 30. Inlet recirculation zone 92 is formed at a "dead zone" in flow path 84 where there is relatively low velocity and minimal turbulence, resulting in relatively minimal dynamic pressure effects. Therefore, the fuel pressure in inlet recirculation zone 92 is mostly static, as opposed to dynamic.

As shown in FIG. 3, inlet nozzle 30 has inlet pressure taps 82A-82B that are located at or near outer diameter 90 of inlet nozzle 30 and open into inlet recirculation zone 92. Inlet pressure taps 82A-82B are aligned substantially parallel to flow axis 86 allowing a portion of the fuel to be diverted into inlet pressure taps 82A-82B. The diverted fuel flows into inlet cavity 80 located in inlet nozzle support structure 62 while the remaining fuel flows into flow tube 32. Wiper seal 96 provides a wiping seal between flow tube 32 and inlet nozzle support structure 62. Inlet cavity 80 is in fluid communication with inlet pressure sensor 42 (see FIG. 1). Because inlet pressure taps 82A-82B open into inlet recirculation zone 92, inlet pressure sensor 42 is primarily subjected to static fuel pressure, which allows for relatively high inlet pressure measurement accuracy. In addition, inlet pressure taps 82A-82B can be aligned substantially parallel to flow axis 86 without creating dynamic pressure effects because inlet pressure taps 82A-82B open into recirculation zone 92. This is counterintuitive, as pressure taps are conventionally oriented so as to avoid an orientation parallel to fluid; in order to avoid a dynamic pressure effect. However, it has been found that inlet pressure taps 82A-82B that open into recirculation zone 92 can relatively accurately sense pressure of fluid in fuel supply line 24 immediately upstream of fuel metering unit 26, before components such as inlet nozzle 30 affect pressures along flow path 84.

Figure 4:
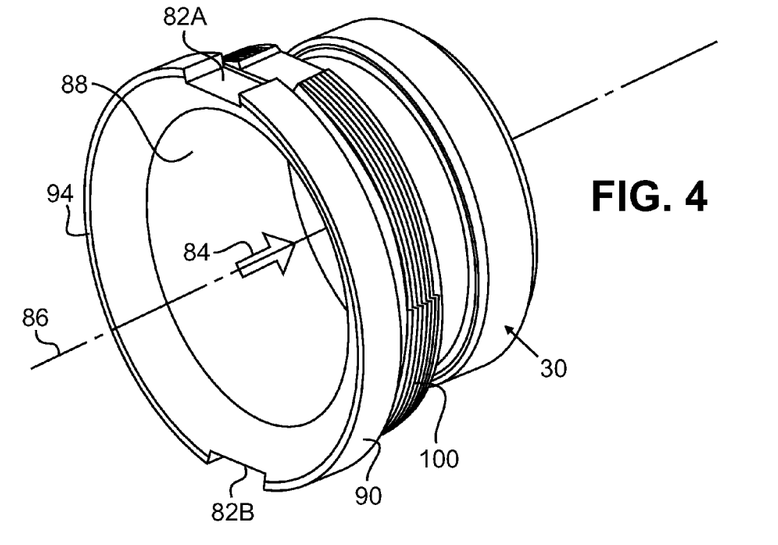
FIG. 4 is a perspective view of the inlet nozzle of FIG. 3.

FIG. 4 is a perspective view of inlet nozzle 30. As shown in FIG. 4, inlet pressure taps 82A-82B are configured as slots located at outer diameter 90 of inlet nozzle 30. Outer diameter 90 is machined to form inlet pressure taps 82A-82B, configured as slots that are substantially rectangular in cross-section, so that the fuel is diverted between inlet nozzle 30 and inlet nozzle support structure 62 (see FIG. 3) to inlet pressure sensor 42 (see FIG. 1). The number of inlet pressure tap 82 can vary as desired for particular applications. Inlet pressure taps 82A-82B can be substantially equally circumferentially spaced around inlet nozzle 30. As shown in FIG. 4, inlet nozzle 30 contains external threads 100 for being connected to inlet nozzle support structure 62.

Figure 5:
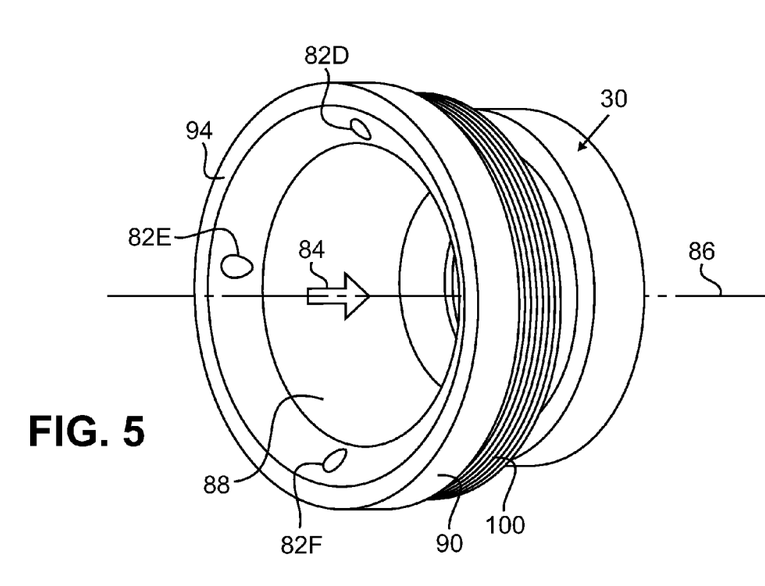
FIG. 5 is a perspective view of an alternative embodiment of the inlet nozzle.

FIG. 5 is a perspective view of an alternative embodiment of inlet nozzle 30. As shown in FIG. 5, inlet pressure taps 82D-82G (inlet pressure tap 82G is not visible in FIG. 5) are configured as substantially cylindrical bores oriented substantially parallel to flow axis 86 and located near outer diameter 90 of inlet nozzle 30. Inlet pressure taps 82D-82G can be substantially equally circumferentially spaced around inlet nozzle 30. The number of inlet pressure tap 82 can vary as desired for particular applications. As in previous embodiments, each inlet pressure tap 82D-82G is in fluid communication with inlet cavity 80 in inlet nozzle support structure 62. This allows a portion of the fuel to be diverted to inlet pressure sensor 42 (see FIG. 1). As shown in FIG. 5, inlet nozzle 30 contains external threads 100 for being connected to inlet nozzle support structure 62.

Figure 6:
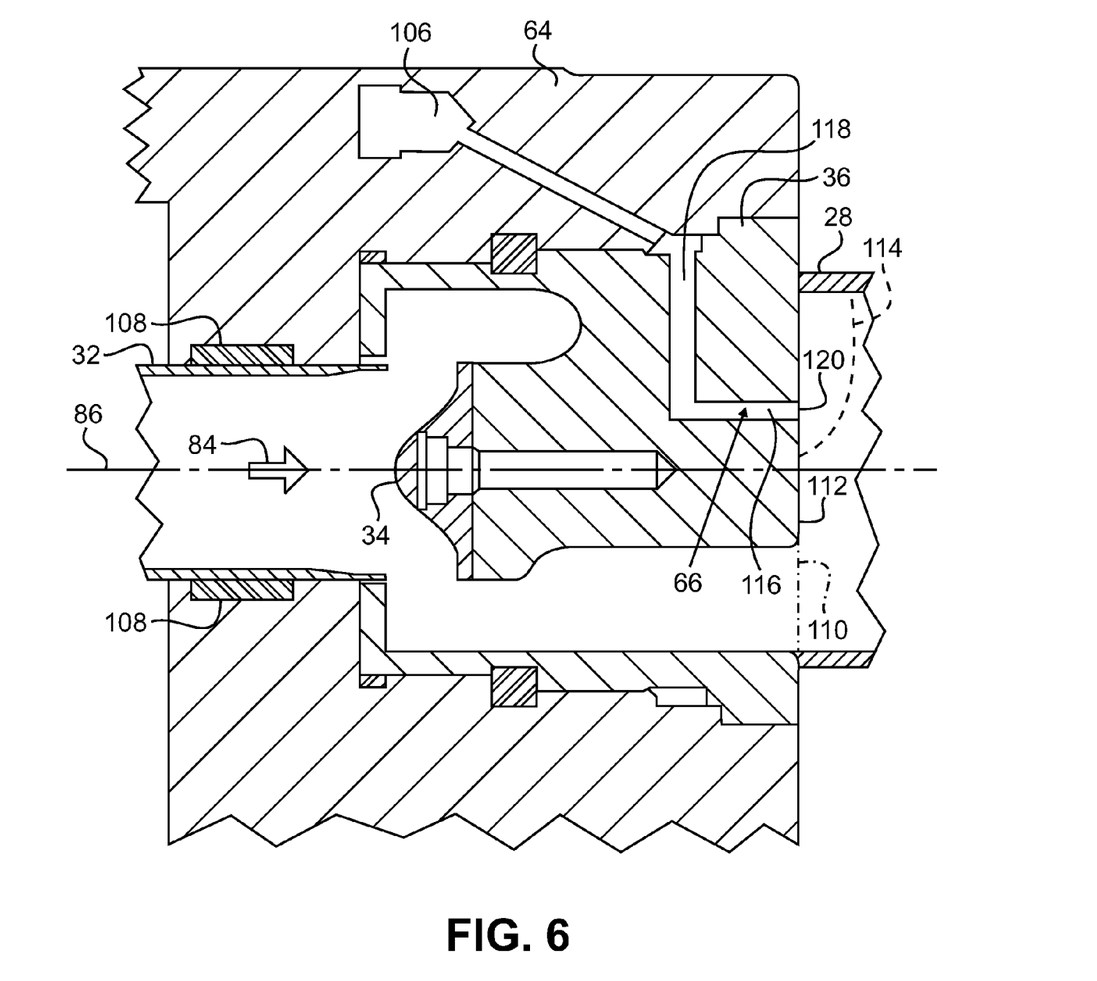
FIG. 6 is a section view of an embodiment of an outlet nozzle and an outlet nozzle support structure of the fuel metering device.

FIG. 6 is a section view of outlet nozzle 36 and outlet nozzle support structure 64. Outlet nozzle 36 is threaded into outlet nozzle support structure 64, which has outlet cavity 106. Outlet nozzle 36 receives the fuel from flow tube 32 and is sealed to flow tube 32 by wiper seal 108. The fuel flows along flow path 84 in the axial direction (i.e., along flow axis 86), first passing flow diverter 34 and then flowing through outlet nozzle 36 and into fuel delivery conduit 28. Outlet nozzle 36 defines downstream plane 110 oriented substantially perpendicular to flow axis 86 such that downstream plane 110 is located on downstream face 112. In addition, outlet nozzle 36 has outlet pressure tap 66 with opening 120 at downstream face 112 on downstream plane 110. Outlet pressure tap 66 diverts a portion of the fuel to outlet pressure sensor 48 (see FIG. 1).

During operation, outlet recirculation zone 114 forms in the fuel along flow path 84 at downstream face 112 of outlet nozzle 36 because the flow in fuel delivery conduit 30 does not fully develop at downstream face 112 of outlet nozzle 36. As a result, there is a "dead zone" with relatively minimal turbulence and therefore relatively minimal dynamic pressure effects. Outlet pressure tap 66 opens into outlet recirculation zone 114, and therefore, outlet pressure sensor 48 is primarily subjected to static pressure, which results in relatively high outlet pressure measurement accuracy.

In the embodiment shown in FIG. 6, outlet pressure tap 66 is configured with first portion 116 and second portion 118, which simplifies manufacturing. First portion 116 (which opens at opening 120) is aligned parallel to flow axis 86 while second portion 118 is aligned perpendicular to flow axis 86. As shown in FIG. 6, opening 120 to outlet pressure tap 66 is located at downstream face 112 of outlet nozzle 36. Outlet pressure tap 66 is in fluid communication with outlet cavity 106 in outlet nozzle support structure 64, therefore, allowing a portion of the fuel to be diverted to outlet pressure sensor 48 (see FIG. 1).

Figure 7:
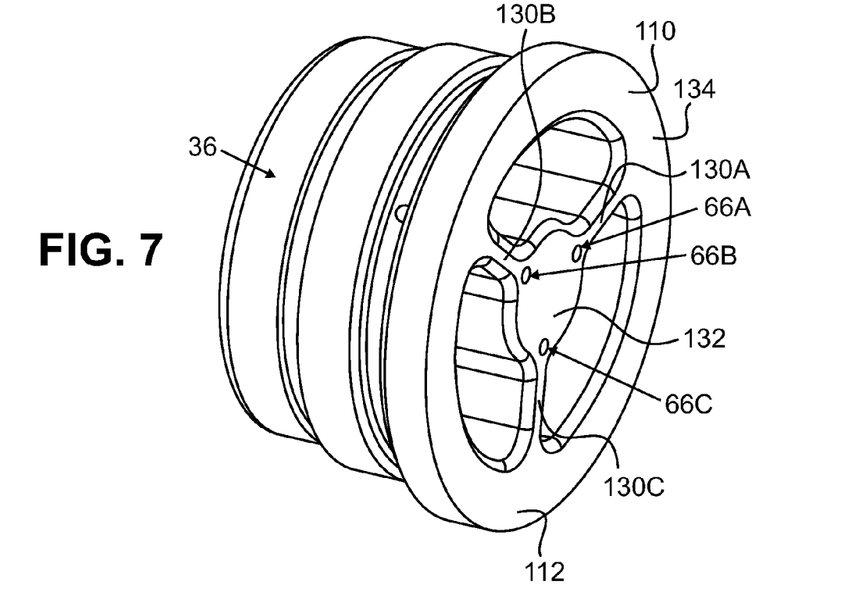
FIG. 7 is a perspective view of the outlet nozzle of FIG. 6.

FIG. 7 is a perspective view of outlet nozzle 36. Outlet nozzle 36 has spokes 130A-130C connecting center portion 132 of outlet nozzle 36 to outer portion 134 of outlet nozzle 36. The fuel flows through outlet nozzle 36 between center portion 132 and outer portion 134. Openings 120A-120C of outlet pressure taps 66A-66C are located on downstream face 112 of outlet nozzle 36 so that outlet pressure taps 66A-66C open to outlet recirculation zone 114 (see FIG. 6).

As shown in FIG. 7, openings 120A-120C to outlet pressure taps 66A-66C are located at center portion 132 of outlet nozzle 36. For each outlet pressure tap 66A-66C, there is a corresponding spoke 130A-130C. The number of outlet pressure taps 66 can vary as desired for particular applications.

Figure 8:
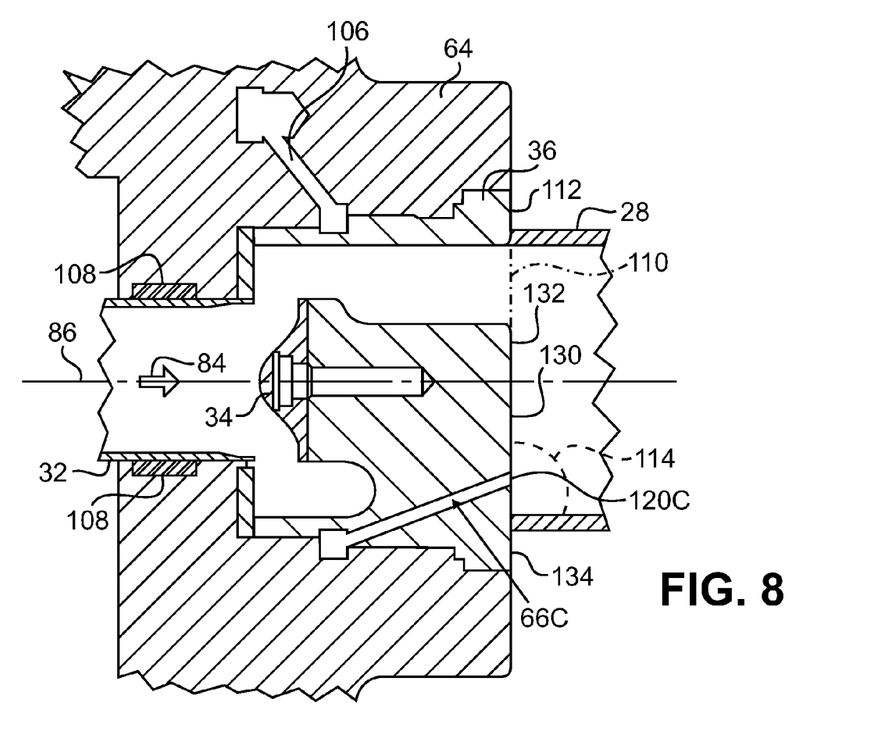
FIG. 8 is a section view of an alternative embodiment of the outlet nozzle.

FIG. 8 is a section view of an alternative embodiment of outlet nozzle 36. Outlet nozzle 36 has spoke 130 connecting center portion 132 of outlet nozzle 36 to outer portion 134. Outlet pressure tap 66 opens to outlet recirculation zone 114 and is oriented at an angle greater than 0 degrees and less than 90 degrees as measured from flow axis 86. As in previous embodiments, outlet pressure tap 66 is in fluid communication with outlet cavity 106 in outlet nozzle support structure 64. In addition, the number of outlet pressure tap 66 can vary as desired for particular applications.

To further increase the accuracy of sensing pressure at outlet nozzle 36, a method is used for calculating a correction factor $C_F$ and generating an outlet pressure signal (e.g., the output signal 50) as a function of the correction factor $C_F$ and the sensed outlet pressure P2. Using the sensed inlet pressure P1, the sensed outlet pressure P2, and the sensed position signal that corresponds to the position of the flow tube relative to flow diverter S (i.e., stroke), the correction factor $C_F$ estimates the difference between the sensed outlet pressure P2 and the actual outlet pressure.

The desire for a correction factor $C_F$ was discovered while testing flow measurement accuracy in fuel metering unit 26. In addition to the previously presented structural inventions that increase the accuracy of measuring fuel metering parameters, the method for calculating the correction factor $C_F$ further increases the accuracy of the outlet signal indicative of the outlet fuel pressure. Testing showed that the system and method of calculating the correction factor $C_F$ and generating the outlet pressure signal as a function of the correction factor $C_F$ and the sensed outlet pressure P2, according to the present invention, produced measurement errors, on average, lower than approximately ±13.80 kPa (2 psig). Prior art devices have measurement errors of ±103.42 kPa (15 psig) for inlet pressure and ±379.21 kPa (55 psig) for outlet pressure. Using the method described in detail below, fuel metering unit 26 accurately measures outlet fuel pressure such that expensive external pressure measurement devices are unnecessary.

The steps are as follows. First, the sensed inlet pressure P1, the sensed outlet pressure P2, and the sensed position signal S are received by processor 40. Second, the correction factor $C_F$ is calculated using the following equation:

$$C_F = -0.0028x^2 + 0.3565x - 0.1702,$$

where $$x = (P1 - P2) * S$$

Third, the correction factor $C_F$ is added to the sensed outlet pressure P2. As a result, the accuracy of measuring the outlet pressure is increased for output signal 50.

While the invention has been described with reference to exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For example, any embodiment of inlet nozzle can be used in combination with any embodiment of outlet nozzle.

The invention claimed is:

1. A device comprising:
   a flow tube;
   a motor for positioning the flow tube;
   an inlet nozzle in fluid communication with the flow tube, the inlet nozzle having an inlet pressure tap;
   an outlet nozzle in fluid communication with the flow tube, the outlet nozzle having an outlet pressure tap; and
   a flow path defined by the inlet nozzle, the flow tube, and the outlet nozzle, the flow path having a plurality of recirculation zones, wherein at least one of the inlet pressure tap and the outlet pressure tap opens within one of the recirculation zones.

2. The device of claim 1 wherein the inlet nozzle further comprises a downstream end and an upstream end, wherein the inlet nozzle forms a toroidal surface having a first diameter at the upstream end larger than a second diameter at the downstream end.

3. The device of claim 1 wherein the inlet nozzle comprises a plurality of inlet pressure taps, and the outlet nozzle comprises a plurality of outlet pressure taps.

4. The device of claim 1 and further comprising an inlet pressure sensor in fluid communication with the inlet pressure tap.

5. The device of claim 1 and further comprising an outlet pressure sensor in fluid communication with the outlet pressure tap.

6. A flow metering device comprising:
   a flow tube;
   a motor for positioning the flow tube;
   an outlet nozzle in fluid communication with the flow tube;
   an flow diverter mechanically coupled to the outlet nozzle;
   a pressure sensor; and
   an inlet nozzle in fluid communication with the flow tube, the inlet nozzle comprising:
      an inner diameter defining a flow path for accepting a fluid along a flow axis;
      an outer diameter; and
      an inlet pressure tap for directing a portion of the fluid to the pressure sensor, wherein the inlet pressure tap is aligned substantially parallel to the flow axis and is located at or near the outer diameter.

7. The device of claim 6 wherein the inlet pressure tap is a slot.

8. The device of claim 6 wherein the inlet pressure tap is a substantially cylindrical bore.

9. The device of claim 6 wherein the inlet nozzle forms a convergent flow path.

10. The device of claim 6 wherein the inlet nozzle further comprises a plurality of inlet pressure taps.

11. The device of claim 6 wherein the inlet nozzle forms a toroidal surface that extends between the inner diameter and the outer diameter and is exposed to the flow path.

12. The device of claim 6 wherein the flow path includes a recirculation zone.

13. The device of claim 12 wherein the inlet pressure tap opens to the recirculation zone.

14. A flow metering device comprising:
   a flow tube;
   a motor for positioning the flow tube;
   an inlet nozzle in fluid communication with the flow tube;
   an outlet nozzle support structure having a cavity;
   an outlet pressure sensor in fluid communication with the cavity; and
   an outlet nozzle in fluid communication with the flow tube and mechanically coupled to the outlet nozzle support structure, the outlet nozzle comprising:
      a flow path along a flow axis;
      a downstream face which defines a downstream plane oriented substantially perpendicular to the flow axis; and an outlet pressure tap, in fluid communication with the cavity, for diverting a portion of the fluid to the outlet pressure sensor, the outlet pressure tap having an opening at the downstream plane.

15. The device of claim 14 wherein the pressure tap comprises a first portion and a second portion, the first portion is aligned parallel to the flow axis and the second portion is aligned perpendicular to the flow axis.

16. The device of claim 14 wherein the pressure tap comprises a hole oriented at an angle greater than 0 degrees and less than 90 degrees with respect to the flow axis.

17. The device of claim 14 wherein the outlet nozzle comprises a plurality of pressure taps.

18. A method for measuring pressure, the method comprising:
   sensing a position of a flow tube relative to an flow diverter;
   sensing an inlet pressure at or near an inlet nozzle;
   sensing an outlet pressure at or near an outlet nozzle;
   calculating a correction factor as a function of sensed position of the flow tube, sensed inlet pressure, and sensed outlet pressure; and
   generating an outlet pressure signal as a function of sensed outlet pressure and the correction factor.

19. The method of claim 18 wherein the calculating step is performed with:

$$\text{correction factor} = -0.0028x^2 + 0.3565x - 0.1702$$

where $$x = (P1 - P2) * S$$

and where
P1=inlet pressure
P2=outlet pressure
S=position of the flow tube.

20. The method of claim 19 wherein the step of generating the outlet pressure signal comprises adding the correction factor to the sensed outlet pressure.

* * * * *